United States Patent [19]

Johnson

[11] Patent Number: 4,552,344
[45] Date of Patent: Nov. 12, 1985

[54] BARRIER FLUID SEALED PISTON FOR ROAD WHEEL SUSPENSION

[75] Inventor: D. Dale Johnson, Mt. Clemens, Mich.

[73] Assignee: Ex-Cell-O Corporation, Troy, Mich.

[21] Appl. No.: 530,939

[22] Filed: Sep. 12, 1983

[51] Int. Cl.⁴ ............................................. F16F 9/36
[52] U.S. Cl. ............................ 267/64.11; 267/124; 188/264 B; 92/156; 92/159; 92/160; 92/183
[58] Field of Search ................. 92/156, 158, 159, 160, 92/174, 182, 183; 188/264 B; 267/124, 64.11

[56] References Cited

U.S. PATENT DOCUMENTS

| | | | |
|---|---|---|---|
| 1,579,409 | 4/1926 | Smith | 92/159 |
| 2,266,691 | 12/1941 | Mercier | 92/156 |
| 2,398,910 | 4/1946 | Pontius | 92/156 |
| 2,649,344 | 8/1953 | Unger | 92/159 |
| 2,683,467 | 7/1954 | Greer | 92/159 |
| 3,216,334 | 11/1965 | Bauer | 92/156 |
| 3,230,977 | 1/1966 | Mercier | 92/174 |

FOREIGN PATENT DOCUMENTS 844990 7/1952 Fed. Rep. of Germany ........ 92/156
515967 12/1939 United Kingdom .................. 92/174

Primary Examiner—Robert E. Garrett
Assistant Examiner—Richard S. Meyer
Attorney, Agent, or Firm—John C. Evans

[57] ABSTRACT

A hydropneumatic suspension unit includes a large diameter flanged road arm spindle which is bolted to the vehicle hull; a road arm has one end rotatably mounted on the road arm spindle and another end mounting a road wheel; a barrier fluid sealed piston is reciprocated relative to a road arm bore to seal an in-arm mechanically operated pneumatic spring which has a gas volume trapped by the barrier fluid sealed piston to support the sprung mass of the vehicle; the sealed piston is defined by a pair of spaced seals and an oil chamber which has an oil charge therein pressurized by preload spring on the piston to displace the oil barrier to both lubricate and preload the pair of spaced seals as the piston is dynamically operated to vary gas compression and produce a resultant pressure on the piston to counteract vertical forces on the road wheel.

2 Claims, 4 Drawing Figures

BARRIER FLUID SEALED PISTON FOR ROAD WHEEL SUSPENSION

FIELD OF THE INVENTION

This invention relates to a self-contained externally mounted hydropneumatic suspension with gas spring and integral damper; more particularly to such units having an in-arm gas spring with a barrier fluid sealed piston assembly.

DESCRIPTION OF THE PRIOR ART

Hydropneumatic suspension systems for multiple wheeled vehicles have a hydropneumatic suspension unit (HSU) for each individual wheel. These HSU's in the past consisted of a gas-fluid spring to support the weight of the vehicle and a restriction to the fluid flow to damp the vehicle. These HSU's were either hull mounted or built into the road arm.

Such hydropneumatic suspension systems have utilized either hull mounted or in-arm self-contained HSU's. These systems are capable of retrofitting existing vehicles which do not contain a suitable hydraulic supply. They are also suitable for new applications where a high performance suspension is required at a reduced size, weight, and cost. They depend on the integrity of their seals, their ability to dissipate heat, and their spring rate at and near the static position to maintain the height and attitude of the vehicle despite changes in the ambient and operating conditions.

One such in-arm unit is set forth in co-pending U.S. Ser. No. 361,944 filed Mar. 25, 1982 now U.S. Pat. No. 4,447,873 and assigned to the same assignee. The in-arm pneumatic spring produces an output force for each vertical position of the road wheel as a function of the initial gas volume and pressure; the adiabatic expansion or contraction of this gas volume; the road arm geometry; and the non-linear mechanism which controls in response to road arm displacement both the effective arm length at which the pneumatic forces act and the displacement of the piston which varies the gas volume. The resultant shaped spring characteristic provides improved static and dynamic suspension system performance. An in-spindle damper is located remotely from the gas volume and is operated independently of the spring mechanism. A non-linear cam which is an integral part of a rotating crankcase housing actuates a piston pump which increases crankcase fluid to a pressure which is a function of the road arm's direction of rotation, displacement, and velocity; and of the pressure-flow characteristics of the hydraulic control system components. The in-spindle damper absorbs energy as a function of this pressure and the friction characteristics at various road arm velocities of the rotary damper. The resultant shaped damper characteristic provides improved dynamic suspension system performance.

The heat generated by the friction damper is transferred to crankcase fluid which is pumped through the damper via integral hydraulic components. This heat is then transferred by the circulating fluid to the large mass and area crankcase housing and then to the surrounding atmosphere, and to the large mass spindle and directly through the large area mounting flange to the vehicle hull; thus, efficiently absorbing and dissipating the heat, minimizing the temperature build-up, and isolating the pneumatic spring from the effects of varying excessive operating temperatures. The spring has a piston which is operated by a slider crank mechanism to vary compression of a trapped volume of gas. The seal assembly for the gas volume is carried by the piston and seals the high pressure gas directly.

An object of the present invention is to provide an improved fluid sealed piston for the gas spring of an in-arm pneumatic suspension unit; the fluid sealed piston having a charged chamber interposed between a set of seals to define an oil seal and seal lubricant barrier between a gas volume and the oil side of the piston as the piston is positioned by a slider crank rod to compress a gas volume of the gas spring.

Another object of the present invention is to provide an in-arm hydropneumatic suspension unit with a slider crank positioned piston relatively positioned within a road arm which piston carries a set of seals thereon that relatively slide and seal with respect to a road arm cylinder wall and wherein the piston further includes a fluid charged chamber to define an oil seal and lubricant for a set of seals to seal oil in a rod displacement cavity from a high pressure gas spring volume within the road arm.

Yet another object of the present invention is to provide an in-arm sealed piston assembly for a pneumatic vehicle suspension unit having relatively positioned rod and seal assembly components and a charged fluid chamber in the piston to pressure seal assembly components to oil seal and lubricate sleeve seals to dynamically seal a gas volume which produces a load equalizing force on the rod in accordance with the position of the piston assembly.

These and other objects of the present invention will be more apparent with reference to the following description and drawings of a preferred embodiment of the invention wherein.

Figure 1:
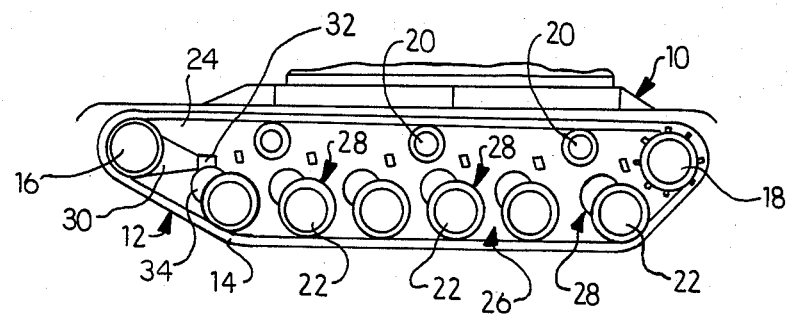
FIG. 1 is a side elevation view of a tracked vehicle with a road wheel suspension system including the present invention.
Figure 2:
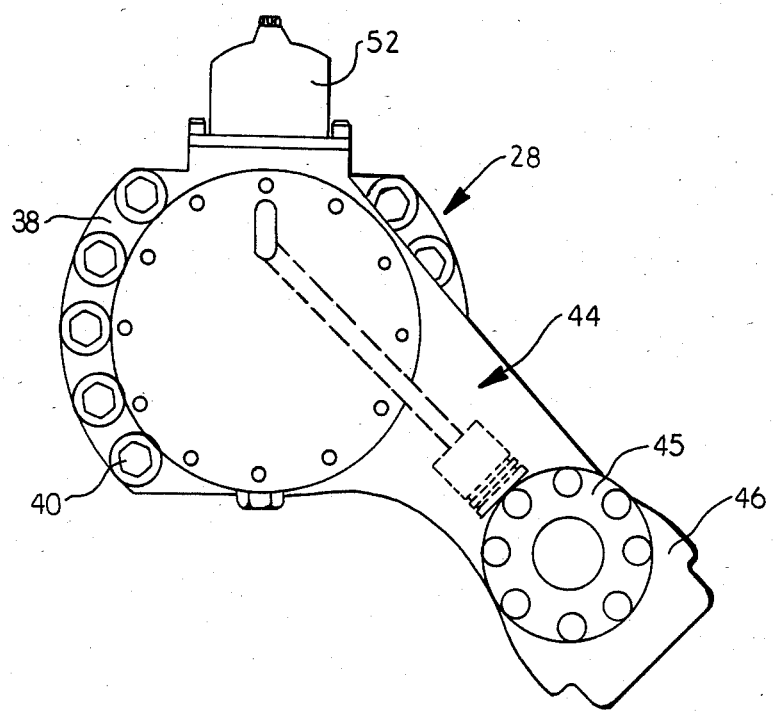
FIG. 2 is a side elevation view of a road arm including the present invention.

Referring now to FIG. 1, an armored vehicle 10 is illustrated. It includes two track laying systems 12 only one of which is shown. The system 12 includes a track 14 guided over an idler wheel 16 and a drive sprocket 18. A plurality of support rollers 20 guide the upper reach of the track. The vehicle is suspended by a plurality of road wheels 22, spaced axially along the side wall 24 of the vehicle hull 26. Each road wheel 22 is carried for vertical movement with respect to the hull by a self-contained, externally mounted hydropneumatic suspension unit 28, hereinafter HSU 28. An adjustable track tensioner 30 is coupled between a compensating idler arm 32 and a spindle housing 34 of the forward-most HSU or is hull mounted.

The systems 12 are representative of track laying systems improved by the present invention which is equally suitable for use on other track systems or on wheeled vehicles.

Figure 3:
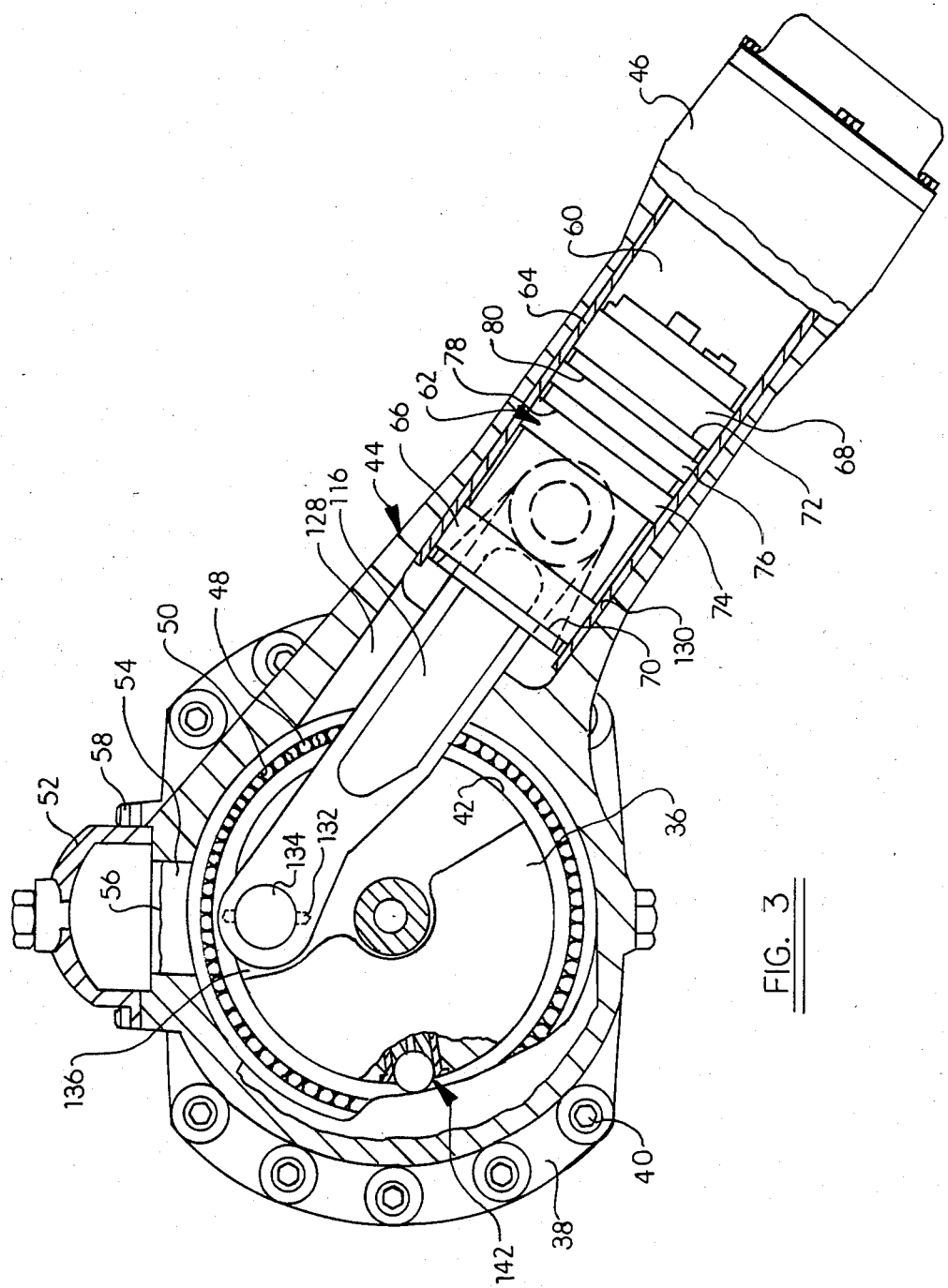
FIG. 3 is a partial sectional view of the road arm showing the piston assembly of the present invention.
Figure 4:
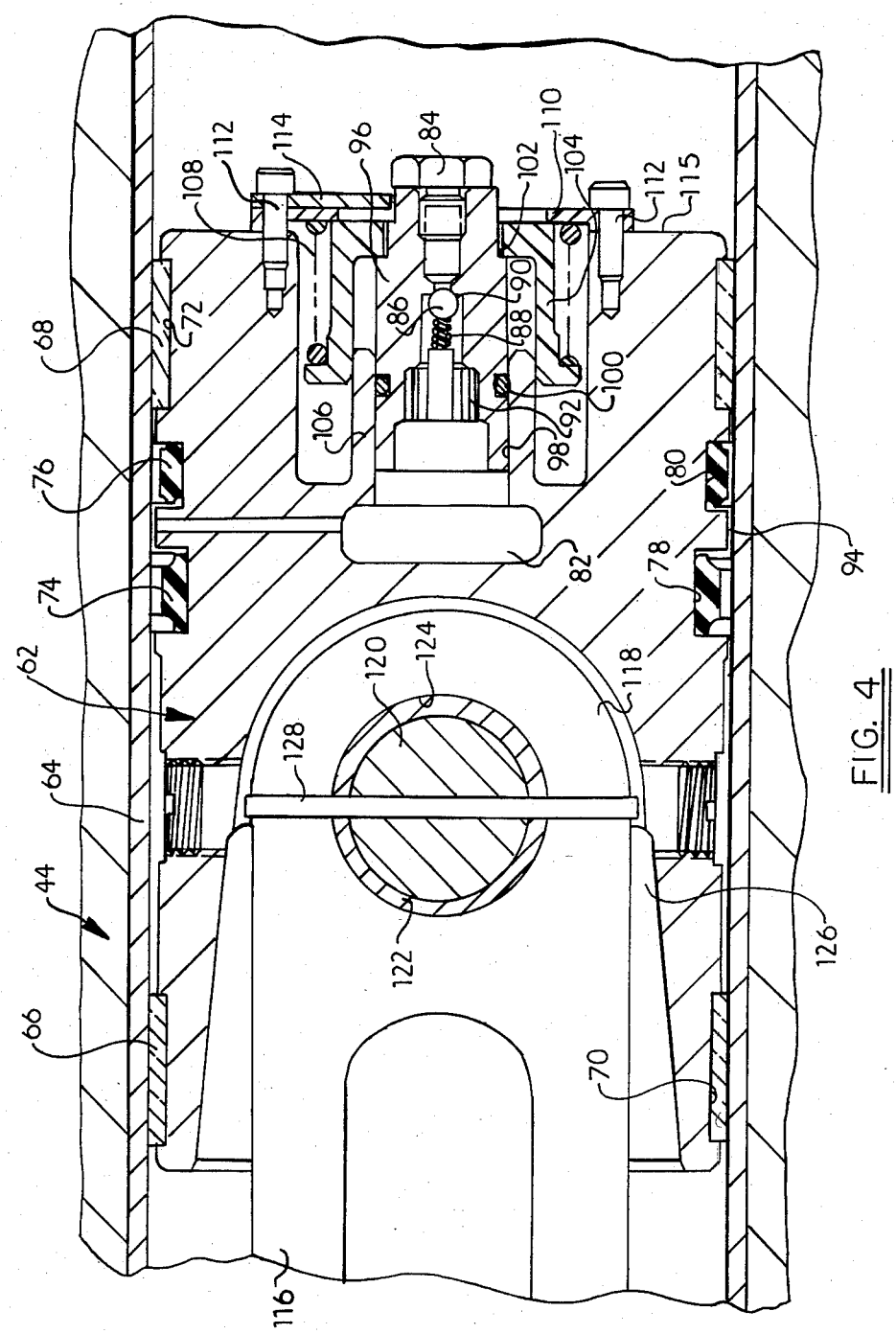
FIG. 4 is an enlarged sectional view taken along the longitudinal axis of the piston assembly in FIG. 3.

Each HSU 28, as shown in FIG. 3 and FIG. 4, is fixedly secured to the vehicle hull 26 by a large diameter road arm spindle 36 having a mounting flange 38 with a plurality of bolts 40 that are threaded to hull 26.

The O.D. diameter 42 of the spindle 36 is selected for purposes which will become more apparent in the text of the aforesaid application and is larger than diameters used in prior HSU assemblies.

A road arm 44 having the spindle housing 34 at one end and a road wheel spindle 45 at the other free end 46 is supported for oscillation on the large outer diameter surface 42 of spindle 36 by complementary tapered roller bearings 48, 50. The large diameter but small cross-section preloaded full complement tapered roller bearings 48, 50 support the road arm both axially and radially in a construction having a minimum volume and a narrow width.

A cover 52 defines the expansion space for a crankcase 54 which is defined by the free volume enclosed within the spindle housing 34 and within the spindle 36. The crankcase is filled with fluid to the level indicated by reference numeral 56 in FIG. 3. Bolts 58 secure cover 52 to the HSU 28.

A mechanically operated, single chamber gas spring 60, is included in the road arm 44. This spring supports that portion of the sprung mass of vehicle 10 that acts at the described road wheel station.

In accordance with certain principles of the present invention, a sealed piston 62 is axially located within a cylinder sleeve 64 in road arm 44. Piston 62 includes a pair of sleeve seals 66, 68 located in end grooves 70, 72 of piston 62. A set of inboard seals 74, 76 are located in piston grooves 78, 80 formed on the O.D. of piston between seals 66, 68. A chamber 82 in piston 62 has an oil charge fitting 84 that directs oil under pressure across a ball check valve 86 that is held by spring 88 against a seat 90. When the unit is precharged with oil from a suitable source, the oil charge lifts valve 86 from seat 90 and the oil passes through a filter 92 into chamber 82 to fill it and the O.D. space 94 defined between sleeve seals 66, 68 with oil.

By virtue of the arrangement, sleeve seal 66 and seal 74 constitute an inboard seal set on piston 62 and sleeve seal 68 and seal 76 constitute an outboard seal set on piston 62.

These seals are lubricated by the oil in space 94. A spring loaded piston 96 is slidably supported in piston bore 98. It is sealed by an O-ring 100 to prevent oil leaks from bore 98. The piston 96 carries charge fitting 84 at one end and houses filter 92 and check valve 86. The piston 96 has a shoulder 102 that is engaged by a spring carriage 104 that is piloted at one end by the O.D. of tubular extension 106 formed in the piston. The spring carriage 104 engages one end of a barrier fluid pressure spring 108. The opposite end of spring 108 engages an end plate 110 secured by screws 112 and fingers 114 to the end 115 of piston 62 which is exposed to pressure of gas spring 60.

The spring 108 biases carriage 104 and piston 96 inwardly of piston 62 to pressurize the oil barrier fluid in the order of 130 psi above the gas pressure in gas spring 60. This keeps the seal sets lubricated and preloaded. Because of the arrangement, seals 68, 76 seal the barrier oil from the gas spring with 130 psi differential. The rear seals 66, 74 seal the barrier at 130 psi above gas chamber pressure. Since oil exposed seals are easier to seal than seals exposed to gas the resultant barrier fluid piston defines a superior dynamic gas sealing system.

As best seen in FIG. 3, a connecting bar 116 has end 118 fastened to piston 62 by wrist pin 120 which is supported by sleeve bearings 122 press fit in bore 124 of piston end 126. A pin 128 connects wrist pin 120 to end 126. The bar 116 passes through a rectangular slot 128 located between spindle housing walls at the closed end of road arm bore 130.

The other end of connecting bar 116 is fastened by a pin 132 to crank shaft 134 in an upper portion 136 of spindle 36.

The initial static pressure ($P_s$) in gas spring operating on face 115 of piston 62 produces a force (F) which is transmitted by connecting bar 116 to spindle 36. The amplitude of this force is equal to the product of the pressure (P), the area of face 115 (A), and the cosine of the angle (cos α) included between the centerline of piston 62 and the centerline of bar 116 (as shown HSU 28 has been designed so that angle α equals zero degrees at the static position) or:

$$F = P_s A \cos \alpha \quad (1)$$

The direction of this force is along the centerline of bar 116.

This force acts at an effective radius ($r_1$) which is the perpendicular distance between the centerline of bearings 50, 52 and the centerline of bar 94 to produce a moment around the centerline of the bearings. An equal and opposite moment reacts on road arm 44. The vertical sprung weight ($F_v$) of vehicle 10 acts at the described HSU 28 at an effective radius ($r_2$) which is the horizontal distance between the centerline of bearings 50, 52 and the centerline of a wheel spindle 45 on free end 46 to produce a second moment about bearings 50, 52. Equating these moments to zero and solving for Fv yields:

$$F_v = \frac{PA \cos \alpha \, r_1}{r_2} \quad (2)$$

The volume of gas chamber 60 at any road arm position is equal to the initial volume ($V_s$) at the static position (S) in FIG. 3 plus or minus the displacement of ($X_p$) of piston 62 times its area A or:

$$V = V_s \pm X_p A \quad (3)$$

The pressure that corresponds to this volume is determined by the adiabatic expansion or compression of gas in the variable volume chamber 60 or:

$$P = P_s \left(\frac{V_s}{V}\right)^\gamma \quad (4)$$

Where the factor $\gamma$ is the ratio of the specific heat of the selected gas at constant volume to the specific heat at constant pressure values are available in published tables. For all displacements of the road arm the piston displacement ($X_p$), the angle ($\alpha$), the effective connecting bar radius ($r_1$), and the effective road arm radius ($r_2$) may be determined by graphical or numerical means. Substituting these values in equations (2), (3), and (4) will permit the vertical force ($F_v$) to be calculated for each displacement.

In the past, damping systems of conventional in-arm suspension units have used restrictions to the flow of fluid between the fluid piston and the gas/fluid separator of a hydropneumatic spring to damp the vehicle oscillations as a function of piston direction of motion and velocity. Such restrictions absorb energy from the system and convert this energy to heat. The heat which is generated has to be dissipated to the surrounding atmosphere from the limited surface area of the arm (which may be caked with dried mud). The resultant increase in temperature causes increases in the fluid volume and the gas pressure which adversely affect the vehicle's height and attitude.

The present invention has a hydraulically controlled rotary friction damper system 142 more specifically described in co-pending U.S. Ser. No. 361,944, filed Mar. 25, 1982 now U.S. Pat. No. 4,447,073. System 142 is located in spindle 36 at a point remote from gas spring 60 and operated independently of the spring drive mechanism and damps the vehicle oscillations as a function of road arm 44 direction of rotation, displacement, and velocity, pressure-flow characteristics of the hydraulic control system and friction-velocity characteristics of a rotary damper. Damper system 142 provides improved dynamic suspension system performance without the heat dissipation problem of conventional in-arm systems.

While the embodiment of the present invention, as herein disclosed, constitutes a preferred form, it is to be understood that other forms might be adopted.

What is claimed is:

1. A self-contained road wheel suspension system comprising in combination, a spindle fixedly secured to a vehicle hull, a road arm having a spindle housing on one end and a road wheel support on the opposite end thereof, bearing means for supporting said spindle housing for rotation relative to said spindle, a fluid filled crankcase defined by said spindle housing and said spindle, mechanically operated single chamber gas spring means at the opposite end of said road arm, said gas spring means including a gas volume and a first piston relatively reciprocated with respect to said arm, seal assembly means carried by said piston and barrier means defining a pressurized oil barrier in said first piston to lubricate and preload the seal assembly means to seal the gas volume; said barrier means including an oil charge port, means forming a chamber in said first piston filled with oil, and means including a spring carriage and a spring for biasing said oil barrier without flow restriction to lubricate and pressure preload said seal assembly means to a pressure greater than that of said gas spring means to produce a predetermined pressure differential across the seal means to maintain the seal lubricated during dynamic operation of said first piston, said barrier means further including a movable second piston carried by said first piston and having one end exposed to the pressure of said gas spring means and the opposite end forcing oil to lubricate and preload the seal assembly means.

2. In the combination of claim 1, said spring carriage being seated on said movable second piston and said spring engaging said first piston and said spring carriage for imposing an external spring force on said movable second piston to cause said seal assembly means to be preloaded at a pressure greater than the pressure changes of said gas spring means.

* * * * *